United States Patent Office 3,311,544
Patented Mar. 28, 1967

3,311,544
PROCESS FOR THE PURIFICATION OF ETHYLENE GLYCOL BY TREATMENT WITH MAGNESIUM OXIDE AND WATER
Lothar Riehl, Grebben, Rhineland, and Erhard Siggel, Laudenbach am Main, Germany, assignors to Vereinigte Glanzstoff-Fabriken A.G., Wuppertal-Elberfeld, Germany
No Drawing. Filed Oct. 15, 1963, Ser. No. 316,429
Claims priority, application Germany, Oct. 18, 1962, V 23,155
5 Claims. (Cl. 203—36)

This invention is concerned with a process for purifying ethylene glycol which is liberated during the production of a polyester, i.e. during the polycondensation of the diglycol glycol of an aromatic dicarboxylic acid such as terephthalic acid.

High molecular weight, linear, fiber-forming polyesters or mixed polyesters are normally produced by polycondensation of diglycol esters of aromatic dicarboxylic acids, the glycol being split off or liberated during the polycondensation reaction and preferably recovered and reused in the production of additional polyester products. In order to obtain linear polyesters which can be formed into high quality filaments or films, it is essential to employ very pure initial materials such as the glycol reactant. Technical glycols contain a number of impurities which are very difficult to separate, and it is well known that great care must be exercised in the preparation and purification of the initial glycol to be used in the manufacture of polyesters. If such impurities are only incompletely removed, then the polyesters obtained from such glycols and aromatic dicarboxylic acids exhibit an undesirably low softening point and a very poor natural color as compared to polyesters produced from a pure glycol.

The glycol liberated as a by-product by distillation from the reaction vessel during the polycondensation process is especially contaminated with impurities, and while it is desirable to recover and reuse this glycol, this result can only be achieved by first subjecting the liberated glycol to very extensive and costly purification procedures. Prior methods of carrying out this purification of the liberated glycol have therefore been unsatisfactory and have generally been characterized by relatively low yields and a low degree of purity even with complex purification methods.

For example, when attempting to purify the liberated ethylene glycol by distillation, there is no sharp separation of impurities from the main distillate run even when using a large number of plates in the distillation column or columns. Instead, the impurities are continuously distilled over together with the ethylene glycol with a very slow reduction of the impurity concentration. As a result, one can separate a pure glycol only when a very large first and last distillate run or fraction contains the impurities and a small middle run or fraction contains the pure glycol. Any attempt to further distill the first and last runs for further separation of impurities is even less satisfactory, and the yields of pure glycol are correspondingly lower.

One object of the present invention is to provide a new and improved process for the purification of a contaminated ethylene glycol which has been obtained as a by-product during the polycondensation of the diethylene glycol ester of an aromatic dicarboxylic acid, especially during the production of polyethylene terephthalate.

Another object of the invention is to recover ethylene glycol during the production of the polyester in high yields and with a high purity sufficient to permit the glycol to be easily reused in the production of high quality polyester fibers and films.

Still another object of the invention is to provide a method of purifying the ethylene glycol liberated in the production of a polyester by a specific technique which can be easily carried out at relatively low cost while still achieving high yields and the required purity of the glycol product.

These and other objects and advantages of the invention will become more apparent upon consideration of the following detailed description of the invention.

In accordance with the invention, it has now been found that the foregoing objects can be achieved so as to obtain a substantially pure ethylene glycol from the contaminated or crude glycol liberated in the production of polyesters by observing the essential limitations set forth in the following procedure. There must be added to the contaminated glycol about 0.5 to 10%, preferably 1 to 5%, by weight of water and 0.001 to 0.1%, preferably 0.005 to 0.01%, by weight of magnesium oxide, and the glycol is boiled under reflux in the presence of said water and magnesium oxide for a period of at least about 20 minutes, preferably about 30 to 90 minutes. Thereafter the ethylene glycol is separated from the refluxed mixture, preferably by conventional distillation of the refluxed mixture.

The process of the invention can also be carried out with the addition of larger amounts of water and magnesium oxide but there is no particular advantage in doing so. Likewise, the reflux of the ethylene glycol can be carried out for longer periods of time, i.e. for more than 90 minutes, but no additional improvement is achieved in this manner. Somewhat shorter reflux periods of time are also feasible, although a minimum reflux period of at least about 20 minutes is generally desirable in order to assure good results.

The reflux and/or the subsequent distillation can be accomplished at about atmospheric pressure or under reduced pressures, i.e. less than atmospheric pressure. It is especially advantageous to reflux and distill under a reduced pressure, for example about 100 to 600 mm. Hg and preferably about 150 to 400 mm. Hg in the reflux step and a preliminary distillation of the water and preferably about 20 to 100 mm. Hg during distillation of the glycol after removal of water. Such reduced pressure conditions permit correspondingly lower temperatures and decomposition of the glycol and reactions of the glycol with the impurities are less likely to occur. The temperature of the reaction mixture or the refluxed mixture during distillation is of course determined by the pressure and corresponds to the boiling point of the particular mixture.

Good yields of pure ethylene glycol can be achieved by the process of the invention by a single distillation of the refluxed mixture in a simple distillation column after first distilling off the added water. For the purpose of such distillation, as well as the preceding reflux, it is preferable to employ columns with bubble plates since they can be operated at relatively lower pressures and the temperature of the reboiler at the bottom of the column is correspondingly lower. After refluxing of the glycol mixture is completed, water is preferably first removed by a preliminary distillation and pure ethylene glycol then recovered in the main run of the remaining substantially water-free mixture.

In recovering the pure glycol from this water-free mixture, the following procedure is especially desirable in obtaining maximum yields of the pure ethylene glycol. It is sufficient to separate a first run at a gradually increasing temperature in two fractions, the lower-boiling fraction being discarded. The higher-boiling fraction of the first run is recovered and retained for further treatment, preferably after accumulating several such fractions from a number of runs. The main run of pure ethylene glycol can then be separated and generally represents well over 50% of the initial water-free mixture. A small final run is then recovered and also accumulated from a number of charges. The resulting accumulations from the first and last runs are again separately refluxed in the presence of water and magnesium oxide according to the invention and distillation again repeated to recover additional amounts of the pure glycol.

The purification procedure of the invention permits a sharp separation of impurities from the main distillate fraction of pure ethylene glycol, and only relatively small distillate amounts accumulate as impure first and last distillate fractions. Even when these impure first and last fractions are subjected to another treatment according to the invention, it is still possible to obtain large amounts of additional pure glycol. Altogether, yields of over 90% can be achieved with very high purity.

Since much lower yields of pure glycol are obtained when the refluxing step of the invention is omitted, it is apparent that this refluxing step causes a chemical change in the impurities contained in the initial crude ethylene glycol. Among the impure components of the ethylene glycol liberated in the production of polyesters, the following have been identified: aldehydes, aldehyde acetals and half-acetals, aldehyde polymerization products of varying molecular weights, half esters and diesters of dicarboxylic acids and apparently decomposition products having an aromatic structure. It is assumed that the reflux treatment according to the invention influences the partial pressures of the impurities contained in the crude glycol as well as forming from these impurities different compounds which differ more sharply in their boiling point with respect to the glycol or which show a lesser tendency to form an azeotropic mixture with the glycol.

The improved purification of the invention can be carried out continuously or discontinuously, and various modifications of the distillation procedure can be accomplished in conventional manner without departing from the spirit or scope of the invention. For example, two or more distillation stages can be employed, slightly impure fractions can be recycled for reflux, and so forth. However, complex procedures are not essential and for most commercial conditions a simple discontinuous process is quite adequate.

In order to accurately control the separation of the pure glycol during distillation, it is advantageous to analyze the ultraviolet spectrum of the distillate because it has been observed that the impurities in the refluxed mixture either cause a large increase in the intensity of the ultraviolet absorption or show an absorption maxima of their own in this spectral range. On the other hand, the ethylene glycol purified according to the invention exhibits only its own particular spectrum. In this manner, the beginning and end of the main distillate fraction can be determined more accurately.

The following example illustrates the process of the invention with specific details, and it will be understood that the invention is not limited to the exact conditions in this example. The percentages by weight are taken with reference to the weight of the crude or impure ethylene glycol.

*Example*

4300 liters of a crude ethylene glycol, which have been separated in the polycondensation of terephthalic acid diethylene glycol ester as a by-product, are heated under reflux in a bubble plate column having a theoretical tray number of 40 with the addition of 3.5% by weight water and 0.008% by weight magnesium oxide. The temperature in the reboiler, which has a volume of 9000 liters, amounts to about 100° C. and a vacuum of 250 mm. Hg is maintained during this refluxing operation. After one hour's heating under reflux, the added water is distilled off at a vacuum of 250 mm. Hg, a vacuum of 50 mm. Hg is then set up to begin the distillation of the glycol. In the following table, additional data of the distillation are shown after most of the water has been removed:

TABLE

|  | Amount of glycol separated, liters | Distillation rate, l./hr. | Distillation temperature at head of column, °C. | Product |
| --- | --- | --- | --- | --- |
| 1st Run: |  |  |  |  |
| (a) | 250 | 150 | 40–80 | Impure glycol. |
| (b) | 650 | 250 | 80–120 | Impure glycol. |
| Main Run | 3,200 | 450 | 120 | Pure glycol. |
| Final Run | 200 | 450 | 120 | Impure glycol. |

The first portion (a) of the first run is discarded, the second portion (b) and the final run are individually separated and collected from a number of distillation charges until about 4000 liters have accumulated. There is then added to these accumulations of impure glycol 4% by weight water and 0.008% by weight magnesium oxide, the resulting mixture heated under reflux for one hour and distilled in the same manner as described. From the second portion (b) of the first run of the first distillation, 71% pure glycol can be recovered, and from the final run of the first distillation 69% pure glycol can be recovered. Thus, about 3200 liters plus an additional amount of about 600 liters pure glycol accrue from the initially introduced 4300 liters of crude ethylene glycol, corresponding to a yield of 90.5%.

The pure ethylene glycol recovered according to the above-described process of the invention is an excellent initial material for esterification of terephthalic acid or transesterification of dimethyl terephthalate and subsequent polycondensation into a polyester suitable for forming high quality filaments and films. The cost of purification by this process is substantially reduced with a corresponding saving in the production of the polyester product. Thus, with the high yields obtained in this purification procedure, only small amounts of ethylene glycol need be discarded. Also, the procedure is relatively simple in its execution so as to require only a minimum amount of attention and control.

The invention is hereby claimed as follows:

1. A process for the purification of a crude ethylene glycol liberated during the production of a polyester which comprises: adding to said glycol about 0.5 to 10% by weight of water and about 0.001 to 0.1% by weight of magnesium oxide, said percentages by weight being calculated with reference to the crude ethylene glycol; boiling said glycol under total reflux in the presence of said water and said magnesium oxide for a period of at least about 20 minutes; and thereafter distilling ethylene glycol from the refluxed mixture.

2. A process as claimed in claim 1 wherein said boiling under reflux is carried out under reduced pressure.

3. A process as claimed in claim 1 wherein there are added to said glycol about 1 to 5% by weight of water and about 0.005 to 0.01% by weight of magnesium oxide, said percentages by weight being calculated with reference to the crude ethylene glycol.

4. A process as claimed in claim 1 wherein the boiling of said glycol under reflux is carried out for a period of about 30 to 90 minutes.

5. A process as claimed in claim 1 wherein said boiling under reflux is carried out under reduced pressure and said glycol is separated from the refluxed mixture by distillation under reduced pressure.

References Cited by the Examiner

UNITED STATES PATENTS

| 1,903,472 | 4/1933 | Oehme | 260—637 |
| 2,788,373 | 4/1957 | Mills et al. | 260—637 |
| 2,793,235 | 5/1957 | Jenkinson | 260—637 |

FOREIGN PATENTS

| 574,079 | 4/1959 | Canada. |

NORMAN YUDKOFF, *Primary Examiner.*

WILBUR L. BASCOMB, Jr., *Examiner.*